US009904587B1

(12) United States Patent
Potlapally et al.

(10) Patent No.: US 9,904,587 B1
(45) Date of Patent: Feb. 27, 2018

(54) DETECTING ANOMALOUS BEHAVIOR IN AN ELECTRONIC ENVIRONMENT USING HARDWARE-BASED INFORMATION

(71) Applicant: Amazon Technologies, Inc., Reno, NV (US)

(72) Inventors: Nachiketh Rao Potlapally, Arlington, VA (US); Donald Lee Bailey, Jr., Penn Laird, VA (US); Richard Weatherly, Vienna, VA (US)

(73) Assignee: Amazon Technologies, Inc., Reno, NV (US)

( * ) Notice: Subject to any disclaimer, the term of this patent is extended or adjusted under 35 U.S.C. 154(b) by 131 days.

(21) Appl. No.: 14/975,295

(22) Filed: Dec. 18, 2015

(51) Int. Cl.
*G06F 11/00* (2006.01)
*G06F 11/07* (2006.01)
*G06F 11/30* (2006.01)
*G06F 11/34* (2006.01)

(52) U.S. Cl.
CPC ........ *G06F 11/079* (2013.01); *G06F 11/0709* (2013.01); *G06F 11/0751* (2013.01); *G06F 11/0757* (2013.01); *G06F 11/0772* (2013.01); *G06F 11/0793* (2013.01); *G06F 11/3006* (2013.01); *G06F 11/3419* (2013.01)

(58) Field of Classification Search
CPC ............. G06F 11/3419; G06F 11/0757; G06F 11/3006; G06F 11/3051; G06F 11/3055
See application file for complete search history.

(56) References Cited

U.S. PATENT DOCUMENTS

| | | | | |
|---|---|---|---|---|
| 5,991,906 A | * | 11/1999 | Hashimoto .... | G01B 31/318527 714/707 |
| 6,550,017 B1 | * | 4/2003 | Moiin ................. | G06F 11/0757 714/14 |
| 2008/0040715 A1 | * | 2/2008 | Cota-Robles ....... | G06F 11/3409 718/1 |
| 2008/0172195 A1 | * | 7/2008 | Nakadaira ........ | G01R 31/31709 702/72 |
| 2010/0199126 A1 | * | 8/2010 | Noguchi ............. | G06F 11/1076 714/6.12 |
| 2012/0303322 A1 | * | 11/2012 | Rego ................... | G06F 11/3495 702/182 |
| 2014/0082407 A1 | * | 3/2014 | Kochut .................. | H04L 41/00 714/2 |

* cited by examiner

*Primary Examiner* — Charles Ehne
(74) *Attorney, Agent, or Firm* — Hogan Lovells US LLP

(57) ABSTRACT

Anomalous behavior in a multi-tenant computing environment may be identified by analyzing hardware sensor value data associated with hardware events on a host machine. A privileged virtual machine instance executing on a host machine acquires hardware sensor values and causes the values to be compared to other hardware sensor value data that may be indicative of anomalous behavior; for example, various threshold values, patterns, and/or signatures of hardware counter values generated by analyzing and correlating hardware event counter data. In this manner, potential anomalous behavior on an instance may be determined without having to access customer data or workloads associated with the instance.

20 Claims, 6 Drawing Sheets

DETECTING ANOMALOUS BEHAVIOR IN AN ELECTRONIC ENVIRONMENT USING HARDWARE-BASED INFORMATION

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource or "cloud" provider. It will often be the case that a user will want one or more cloud resources to perform actions on behalf of the user. These and other actions may cause anomalous behavior with regard to the resources, such that the actions of one user can affect performance or security of other users because of the anomalous behavior, which may be intentionally malicious. While some security measures may be in place to identify the presence of anomalous behavior, these security measures may require expensive access to customer data and/or require significant overhead of the computing resources in order to identify anomalous behavior.

BRIEF DESCRIPTION OF THE DRAWINGS

Various embodiments in accordance with the present disclosure will be described with reference to the drawings, in which.

DETAILED DESCRIPTION

Figure 1:
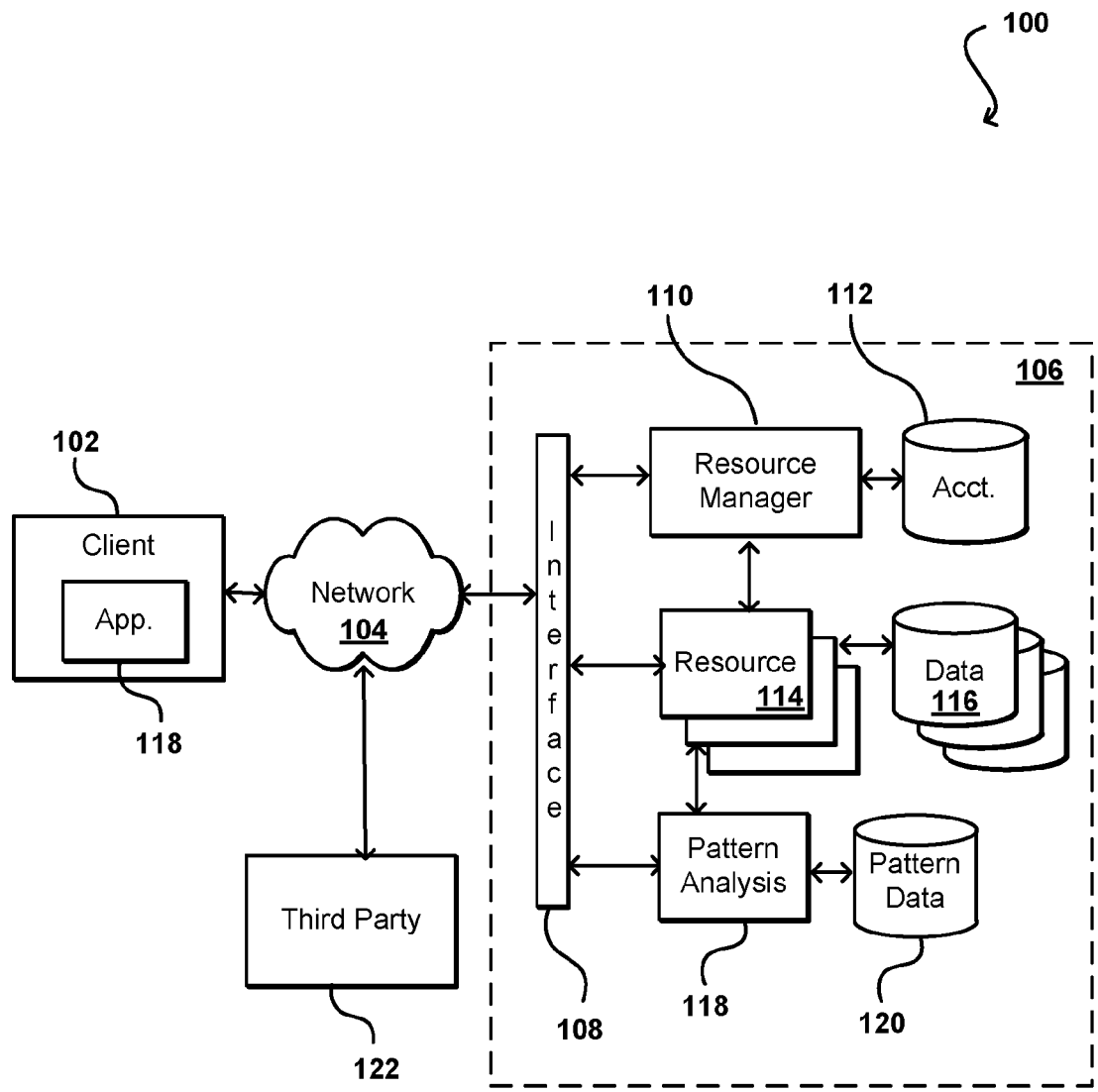
FIG. 1 illustrates an example environment 100 in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the identification and/or remediation of anomalous behavior occurring in an electronic environment such as a multi-tenant computing environment (e.g., a cloud computing environment, etc.), for example on a single virtual machine (VM) instance, a host computing device, and/or multiple VM instances across various host computing devices, singularly or in the aggregate. In at least some embodiments, various events are generated as a result of instructions being executed on a processing system; for example, an application or workload running in a virtual machine (VM) instance associated with a particular customer and utilizing the processing system of the host computing device may cause various types of hardware events to occur at the processing system. These events, such as cache misses, instructions executed, etc., may cause a value of a sensor such as a hardware performance counter to be incremented or otherwise modified, for example in order to keep track of the events. There may be a separate counter associated with each type of event, the counter value being incremented only upon detection of the associated event. Additionally, sensor data (e.g., from hardware sensors, virtual sensors, etc.) or other types of data may be created, collected, and utilized in accordance with the techniques described herein; for example, thermal data from a CPU, virtual CPU (vCPU) instruction execution behavior, log records from a network interface device, telemetry data, or other data and/or events that may be generated, stored, and/or triggered as a result of sensor data. At various intervals, a privileged instance running on the host computing device, such as a DOM-0 domain, or similar type of privileged instance, or other mechanism such as adjunct hardware, hardware monitoring component, out-of-band hardware, or other component may utilize its privileged status to access the hardware counters and obtain the recorded counter values stored therein, although in various embodiments the values are sent to the privileged instance, such as by a software or firmware agent executing on the host computing device. In various embodiments, data in addition to, or instead of hardware (or virtual hardware) counter data, may be obtained and utilized; for example, a range of thermal activity from a component such as a CPU or GPU, even in and across multiple platforms (e.g., a rise rate of thermal values in one resource performing some task compared to another resource performing a similar or different task over some time, etc.); a derivative change of data (e.g., events, errors, etc.) indicating acceleration, velocity, frequency, etc. of various readings or measurements, or a change in the readings, etc. Hardware and virtual counters may be used in any combination with other sensors, in various embodiments.

The privileged instance may then take an action with the obtained counter values; for example, in various embodiments some level of analysis with regard to the obtained counter values may occur at the privileged instance, while in some embodiments the counter values are sent or otherwise transmitted without preliminary analysis to another component of the multi-tenant computing environment, such as a central computing device or resource on which a database is maintained or otherwise accessible, for example being stored on another device that is networked with the component of the multi-tenant computing environment. The received counter values are then analyzed at the component of the multi-tenant computing environment and/or otherwise compared to the database, which in various embodiments contains hardware counter data such as detection patterns and/or signatures of hardware counter values that may be indicative or otherwise predictive of various anomalous behaviors. Based on comparing the received counter values to the database of hardware counter data, such as by generating and evaluating metrics relating to a likelihood of the received counter values being indicative of various types of anomalous behavior (e.g., comparing the received counter values to the hardware counter data such as patterns and/or signatures and generating statistics describing the likelihood of anomalous behavior, etc.), anomalous behavior may be identified and remedial actions taken in response. In various embodiments, the detection of anomalous behavior may be performed without having to access data and/or workloads associated with customers of the multi-tenant computing environment. Anomalous behavior may be malicious behavior, sub-standard performance, malfunctioning behavior, potential component failure, etc.

Various other such functions can be used as well within the scope of the various embodiments as would be apparent to one of ordinary skill in the art in light of the teachings and suggestions contained herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment 106 (i.e., a "multi-tenant environment") may include various types of electronic resources that can be utilized concurrently by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received at an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received at the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In at least some embodiments, hardware counter values associated with one or more resources 114 may be utilized in order to proactively detect any potentially anomalous behavior, for example malicious action occurring on customer instances, performance degradation on one or more resources 114, potential hardware failure, or other types of anomalous behavior. Accordingly, the resources 114 in the resource provider environment 106 can be configured to work with a pattern analysis component and/or service 118 and a pattern database or data store 120, or other such system or component, in order to obtain, store, analyze, and/or manage hardware counter patterns for use in identifying potential anomalous behavior. In some embodiments the pattern analysis 118 will maintain hardware counter data, such as detection patterns, signatures, historical and/or reference counter values, or other data, in a pattern data store 120, or other such location, and can perform hardware counter analysis on behalf of the resources, in order to identify anomalous behavior in the resource provider environment. The pattern analysis component 118 and pattern database 120 can be provided using any appropriate resources as discussed elsewhere herein for providing various services, as may include one or more servers, data storage devices, network interconnect, and the like.

As mentioned, various physical and/or virtual components such as hardware performance counters, hardware sensors, virtual counters and/or sensors, etc. may be used according to techniques described herein to identify, predict, and/or respond to various forms of anomalous behavior; for example, caused by or on a resource such as a host computing device, an instance, a droplet, or other element in a multi-tenant computing environment. Types of anomalous behavior may include intentional malicious behavior by a customer (e.g., launching various types of attacks such as denial of service (DOS) attacks, side channel exploits, row hammer exploits, etc.), performance degradation (e.g., applications that poorly allocate memory, excessive database queries, particular instructions that cause sub-optimal performance of a particular hardware component, etc.), and impending hardware failure (e.g., hard drive failures, corrupted memory components, network interface errors, etc.). Because multiple customer instances may be running on the same hardware in a multi-tenant computing environment, anomalous behavior in such an environment can impact security and performance of co-resident customers, so it can be desirable to quickly identify and remedy anomalous behavior; however, data privacy and performance considerations may make the use of invasive and/or computationally expensive tools unadvisable.

Hardware performance counters are traditionally used to provide low-level introspection of instructions carried out by a hardware component (e.g., processor, memory, network interface, etc.) in order to evaluate and precisely fine-tune software performance. Accordingly, approaches in accordance with various embodiments improve the operation and performance of the computing device(s) on which they are implemented and with which they communicate by, among other advantages, using hardware counters in unconventional ways to provide techniques to identify, predict, and/or ameliorate anomalous behavior occurring in a multi-tenant environment, without causing undue performance degradation or impacting customer privacy by needing to access customer data and/or workloads. Additionally, the disclosed approaches improve an existing technology (e.g., cloud computing infrastructure management, etc.) by providing techniques to address problems (e.g., addressing anomalous behavior without unduly affecting performance or privacy, etc.) arising due to the nature of the technology itself (e.g., co-resident customers executing workloads on the same hardware, etc.). Various other applications, processes, and uses are presented below with respect to the various embodiments, each of which improves the operation and performance of the computing device(s) on which they are implemented.

Figure 2:
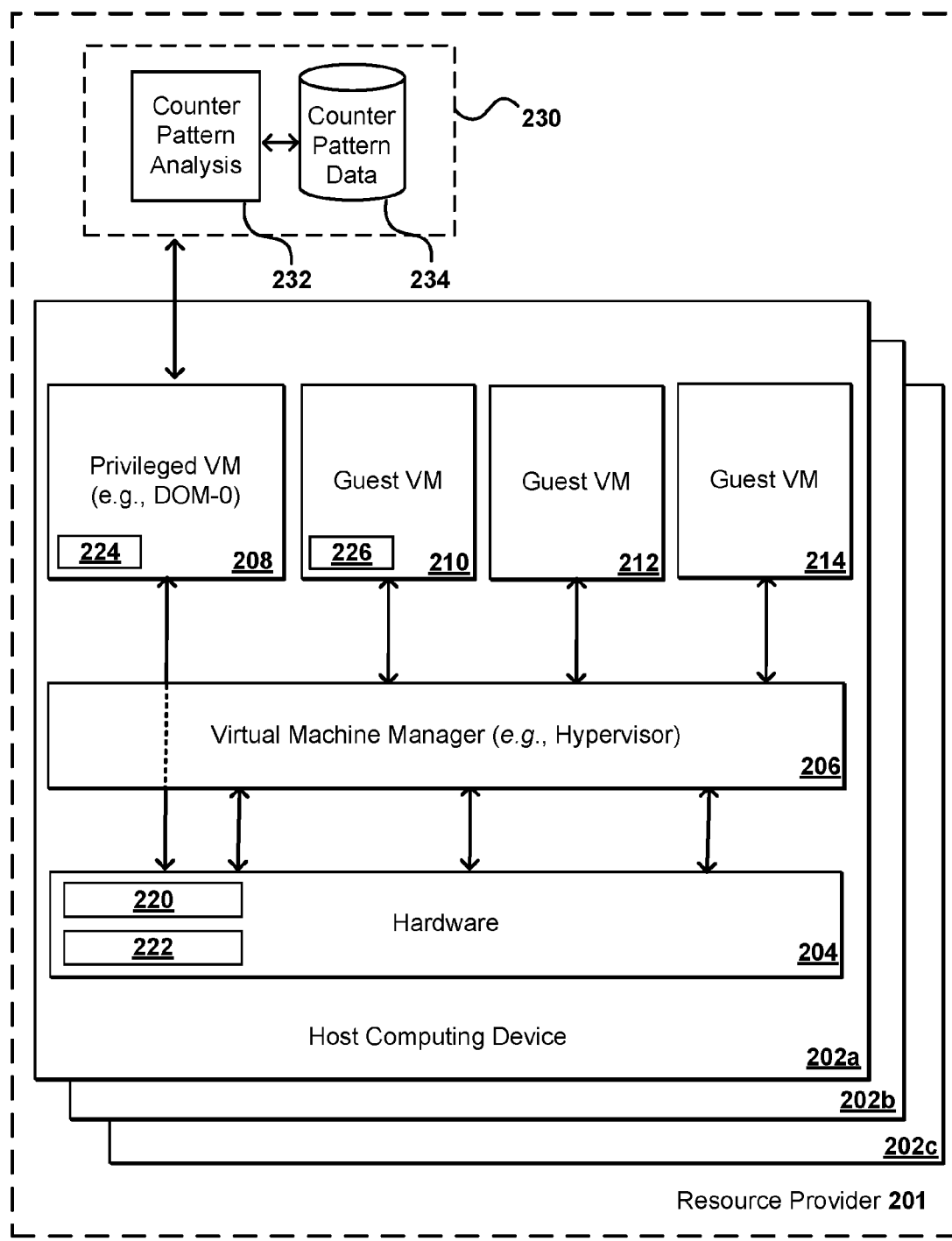
FIG. 2 illustrates an example set of components 200 that can be utilized in a resource provider environment in accordance with various embodiments.

Accordingly, FIG. 2 illustrates an example set of components 200 that can be utilized in a resource provider environment, in accordance with various embodiments. In this example, a resource provider environment 201, such as described above with reference to FIG. 1, may comprise multiple resources; e.g., host computing devices 202a-202c. While host computing devices 202a-202c in the example of FIG. 2 may be presented as identical for illustrative purposes, it should be understood that the techniques described herein are not limited to the illustrated configurations, and may be implemented on various host computing devices in the resource provider environment 201, each comprising various functions and/or configurations (e.g., web servers, data stores, etc.). Each host computing device 202a-202c may be running multiple virtual machines 208-214 (also referred to as "instances" or "droplets" herein).

Hardware 204 (e.g., a processor, a memory, and other such components) of the host computing device 202a is able to interface with a Virtual Machine Manager (VMM) 206 that may be running directly on the hardware 204, such in the case of a "bare metal" or native hypervisor. Examples of hypervisors useful for such purposes include Xen, Hyper-V®, and the like. Hypervisors typically run at a higher, more privileged processor state than any other software on the host computing device 202a, and provide services such as memory management and processor scheduling for dependent virtual machines 208-214. The most privileged of such may include a privileged virtual machine instance (e.g., a host domain, DOM-0, etc.) 208 that may include an administrative operating system for configuring the operation and functionality of the hypervisor 206, as well as that of virtual machines of lower privilege, such as the guest virtual machines (e.g., DOM-U, etc.) 210, 212, 214 or other operating systems, which may be heterogeneous (i.e., running different operating systems than each other). The privileged virtual machine (i.e., Dom-0) is a virtual machine running on top of the hypervisor, and runs with higher privileges for management purposes. There may be one or more hypervisors or resource management/monitoring mechanisms utilized, both internally running on the host machine and/or being provided by adjunct hardware, eg. add-on cards and/or other out-of-band monitoring machines or devices.

In the example of FIG. 2, hardware 204 includes a number of hardware performance counters 220, 222 (herein, "hardware counters" or simply, "counters"). Hardware counters may comprise special-purpose registers or similar components associated with a processing system of a computing device that operate to store counts of hardware-related activities ("events"), generally resulting from running software applications or otherwise causing instructions to be executed by the processor. While the number of counters associated with a given processor varies, generally each counter is associated with a particular event. For example, depending on the hardware configuration, there may be a counter to record each of a number of L1 cache hits and/or misses, a number of instructions issued, a number of floating point instructions executed, a number of vector instructions, a number of branch mispredictions, etc.

According to various embodiments, a privileged instance such as privileged VM 208, because of its ability to access the hardware, and by extension the hardware counters 220-222, may periodically acquire current values from one or more of the hardware counters 220-222. For example, a monitoring software component 224 may execute on privileged VM 208, and retrieve values from hardware counters 220-222, or cause the values to be transmitted to it, depending on the embodiment. Additional or different components of host computing device 202a may also be utilized to perform this task, such as a software agent executing on the VMM 206 or some other resource having adequate privilege to access hardware counters 220-222. In any event, once the values of hardware counters 220-222 have been acquired, in various embodiments the values are sent to a central component 230 of the resource provider environment 201, for example over a network connection. In various embodiments, central component 230 may be software, firmware, or hardware, operating within resource provider environment 201, such as a central computing device having a database stored thereon. In some embodiments, central component 230 may operate outside of resource provider environment 201, accessible via a network. As discussed further herein, central component 230 may be accessible to external entities, such as through an Application Programming Interface (API) exposed by resource provider environment 201.

According to the example of FIG. 2, central component 230 comprises a counter pattern analysis component 232 and a counter pattern data store 234, although the functionality described herein may be performed by additional or alternate components, or performed by a single component, depending on various embodiments. In at least some embodiments, once counter values are acquired by the privileged instance 208, they are communicated to central component 230, where they are analyzed by the counter pattern analysis component 232, for example to determine a pattern or signature in the counter data, such as by comparing the counter values to the counter pattern data 234.

For example, various types of anomalous behavior may be identifiable based on particular threshold values, patterns, and/or signatures of hardware counter values. One example is a cache-based side-channel exploit, in which an attacker (e.g., a customer executing malicious software on an instance 210 of the resource provider environment 201) issues a large number of cache flushes in an attempt to extract sensitive information belonging to another customer running another instance 212 on the same host computing device 202a. These cache flushes create hardware events that may be tracked by a hardware counter 220, and by analyzing and correlating hardware events as represented by the counter values, a pattern or signature may be identified that provides an indication or probability of anomalous behavior. In the example of the cache-based side-channel exploit, if a customer associated with one of the guest instances 210 were attempting the exploit, then a value of hardware counter 220 would be incremented upon each cache flush event. Periodically, the value of hardware counter 220 would be acquired by or sent to privileged instance 208, and then transmitted to central component 230 for analysis. Counter pattern analysis component 232, upon receiving the counter value, may take various actions, such as determining that the value is above a particular threshold, thereby triggering further analysis, or may determine that the value is not indicative of anomalous behavior, and simply transfer the counter value, potentially along with other data (e.g., data indicative of context for the counter value, such as source, time, etc.) to counter pattern data store 234, to be utilized for pattern generation, etc., as described more fully herein.

If, in the current example, counter pattern analysis component 232 operates to determine whether or not the current value is indicative of anomalous behavior (e.g., by determining the counter value is above a particular threshold, etc.), then counter pattern analysis component 232 may use the received counter value, potentially along with other data such as previous counter values received from the particular counter in the present example, time data associated with the counter values, context data, etc., and attempt to identify whether or not the counter values match a pattern or signature of potential anomalous behavior, such as may be stored in counter pattern data store 234. According to various embodiments, various tools such as machine learning, neural networks, etc. may be utilized on historical and/or reference counter value data and other data to identify threshold values, patterns, and/or signatures of counter values that may be indicative of anomalous behavior, as well as the particular type(s) of the anomalous behavior. For example, workloads indicative of known anomalous behavior may be used as a training set in order to identify corresponding counter values that may be predictive of future anomalous behavior when various thresholds, patterns, and/or signatures of counter values are present.

In the example of FIG. 2, if central component 230 determines that anomalous behavior is or may be present at host computing device 202a, then remedial actions may be triggered at host computing device 202a, for example in response to an alert or other data sent from central component 230 indicating potential anomalous behavior.

Figure 3:
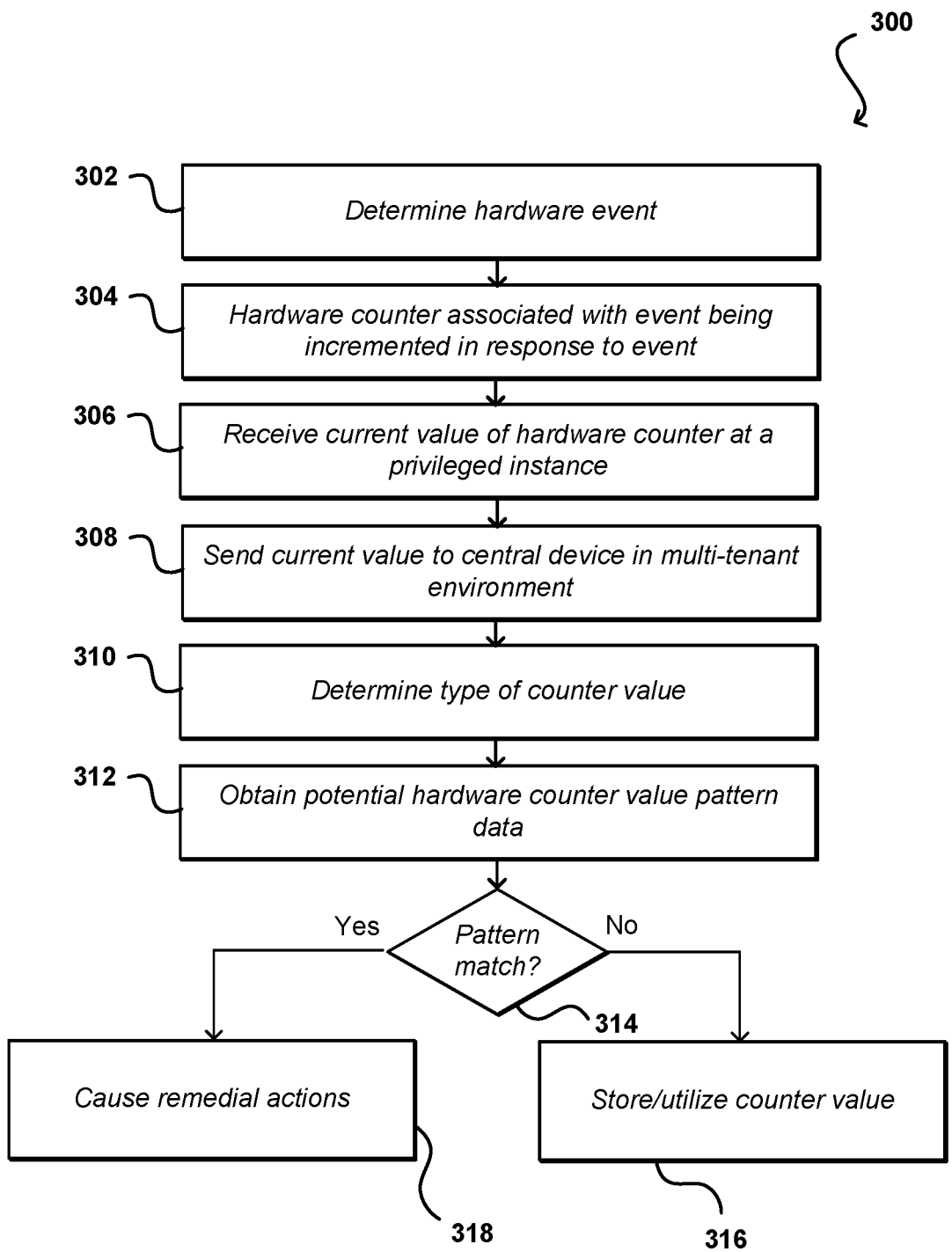
FIG. 3 illustrates an example process for detecting anomalous behavior in an electronic environment using hardware-based information that can be utilized in accordance with various embodiments.

FIG. 3 illustrates an example process for detecting anomalous behavior in an electronic environment using hardware-based information that can be utilized in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel, or adapted in various ways. Furthermore, it should be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In the example of FIG. 3, a hardware event generated at a processing system (e.g., processor, memory, network interface, etc.) of a host computing device in a multi-tenant environment is detected 302. An event in various embodiments may be considered to be any identifiable occurrence that has significance for system hardware or software; therefore, according to various embodiments, events may be associated with hardware, software, virtual hardware, sensors, virtual sensors, and the like. For example, virtual CPUs may be monitored, and data may be generated by virtual counters or other sensors, whether associated with the virtual machine or with the virtual machine monitoring/management system, or other components that monitor virtual components. The hardware event may be generated by the host computing device in response to instructions and/or workloads being executed on a customer virtual machine instance that is running on the host computing device. A hardware counter associated with the event is incremented 304 in response. For example, if a workload executing on a virtual machine instance associated with a particular customer causes a "cache miss" event at the processing system of the host computing device, then if a hardware counter is provided that is associated with "cache miss" events, the counter is incremented. While hardware counter values may be reset periodically, if the hardware counter value was zero prior to the "cache miss" event, then after the "cache miss event," the counter would be one.

The host computing device may be running several instances in addition to the customer instance. As a result, anomalous behavior occurring on an instance may put other instances sharing the hardware of the host computing device at risk for security breaches, performance degradation, and/or other detriments. In some cases, the anomalous behavior may not be associated with a particular instance, but may be indicative of impending hardware failures at the host computing device that could result in customer down-time and data loss.

One of the other instances running on the host computing device may comprise a "privileged instance," such as a DOM-0 domain, that has elevated privileges as discussed earlier, such that the privileged instance can access the hardware counter values. At a particular interval, the privileged instance receives a current value of one or more of the hardware counters 306, for example by requesting the value from the processing system of the host computing device, or accessing the values directly. According to various embodiments, the privileged instance may receive all hardware counter values at the particular interval, a subset of the hardware counter values at one interval and the remainder at another interval, or any other combination of hardware counter(s) and interval(s). As discussed herein, hardware counters are not the only type of data utilized in various embodiments; for example, thermal data from a CPU or GPU, virtual CPU (vCPU) instruction execution general behavior (time, frequency, volume, etc.), events and/or log data from a network interface, etc. may be utilized along with or in place of a hardware counter and a hardware counter value.

After receiving the counter value(s), the privileged instance may take various actions, such as sending the value(s) to a central device 308 in the multi-tenant environment; for example, a central computing device, server, a device hosting a database ("central database"), etc., as discussed further above. The central device may comprise a "back-end" resource of the multi-tenant environment, and may comprise, or be in communication with resources capable of storing, retrieving, analyzing, comparing, and generating data associated with hardware counter values, types of anomalous behavior, and/or other data. According to various embodiments, the central device ingests and stores reference hardware counter data, such as that sent to it by privileged instances as described herein. The central device may process the reference counter value data, along with other data (such as confirmation data indicating whether the existence of and/or type of anomalous behavior was actually prevalent when indicated to be by the reference counter value data), using various analytical techniques, machine learning, neural-network based training, etc., in order to analyze and identify various potential signals associated with hardware counter data (e.g., threshold values, signatures, patterns, etc.) that may be indicative of anomalous behavior. Additionally, the central device may have data capable of identifying potential types of anomalous behavior. According to various embodiments, the central device may expose various types of data to external entities, for example through an API. This data may comprise not only the reference hardware counter values and other data, but also may comprise data indicative of various low-level instructions, hardware commands, processor values, customer workloads, etc., that resulted in the anomalous behavior associated with the reference hardware counter values and other data. This aggregation of data may prove useful, for example to hardware manufacturers or other parties seeking to debug particular hardware components with real-world data. In some embodiments, this data is anonymized prior to being made available through the API.

Once the hardware counter value is received by the central device in the multi-tenant environment, a type of counter associated with the value may be determined 310; for example, if the hardware counter value is associated with hardware counters tracking "cache miss" events, then this information may be used to narrow down the data set used to predict anomalous behavior. For example, a database associated with the central computing device stores hardware counter patterns, which may be based on historical and/or reference values of various hardware counters and broken down by type of hardware counter. One or more patterns (or threshold values, signatures, etc.) potentially indicative of anomalous behavior are obtained 312 from the database and compared, for example with the received counter value(s). In some embodiments, only the most recently received counter value is used in the comparison, while in other embodiments, multiple values of the particular counter, such as that received over a period of time, may be used, as may an average or other statistical manipulation of the counter values.

The current value (or other data, as just described) of the particular counter is compared to the one or more hardware counter patterns stored in the database at the central "back-end" device 314, and if a match is found (or, as discussed herein, if one or more metrics meet a particular threshold, etc.), then it may be determined that anomalous behavior is associated with an execution of a workload (e.g. instructions, applications, etc.) at the customer instance, and a remedial action may be initiated 318. If no match is made to a suitable degree of certainty or statistical acceptability, then the counter value is stored 316 in the database for pattern derivation and future analysis.

According to various embodiments, a "match" may be considered more than matching a counter value to a single pattern of counter values. As discussed herein, hardware counters may be utilized in concert with, or exclusive to, various types of sensors and sensor data. In some embodiments, combinations of sensor values, counter values, etc., taken as a whole in some cases, may indicate the existence of various potential conditions. Multiple data values over time, ranges of values, or continuous streams of data may be obtained from various components of a component in question, all or a subset of which may be utilized to determine whether a pattern or signature exists in the data that could be indicative of a potential of anomalous behavior at one or more devices.

According to an embodiment, a metric such as a correlation metric may be generated as a result of comparing current counter values to the database of counter data (e.g., patterns, etc.). For example, each of the patterns in the set of potential patterns indicative of anomalous behavior may be associated with a particular type of anomalous behavior, such as malicious behavior, potential hardware failure, etc. Once the current counter value is compared to the set of potential patterns indicative of anomalous behavior, then the correlation metric may indicate a probability of a particular type of anomalous behavior. For example, if the current counter value being analyzed matches three counter patterns, each associated with a different type of anomalous behavior, then the matches may be ranked in order of likelihood, such as by the correlation metric. This determination of a particular type of anomalous behavior may then be utilized in determination of appropriate remedial action.

According to various embodiments, remedial action may be initiated at the host computing device as a result of determining the existence of potential anomalous behavior. Remedial action may comprise various actions, such as: causing one or more diagnostic tests to be performed, such as more expensive tests or techniques operable to confirm or ameliorate various types of anomalous behavior, modifying a hardware component replacement schedule, suspending workloads running on various instances of the host computing device, isolating one or more instances of the host computing device, generating alarms, alerts, notifications, etc. for users, administrators, etc., migrating data, increasing counter value sampling rates/intervals, and the like.

Figure 4:
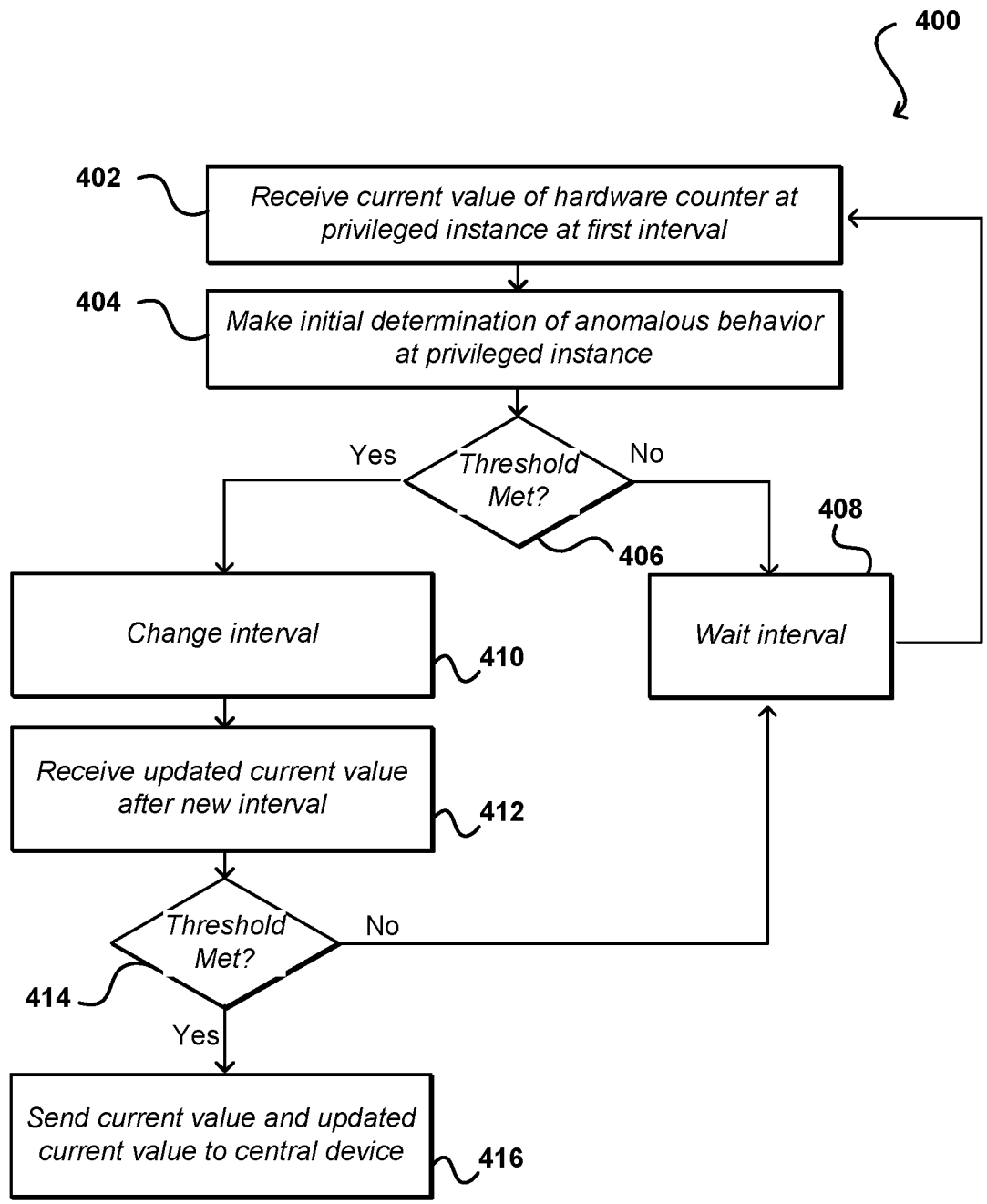
FIG. 4 illustrates an example process for using hardware-based information to make an initial determination of anomalous behavior at a privileged instance of an electronic environment that can be utilized in accordance with various embodiments.

FIG. 4 illustrates an example process 400 for making an initial determination of anomalous behavior in an electronic environment using hardware-based information that can be utilized in accordance with various embodiments, for example where the collection of data may be utilized to determine subsequent data collection patterns, for example. In this example, a current value of a hardware counter is received 402, for example at a privileged instance (e.g., DOM-0) of a host computing device. According to an embodiment, the value is received at a particular interval; e.g., every 5 minutes, etc. Once the current value is received at the privileged instance, a preliminary analysis is performed to provide an initial indication of whether anomalous behavior is occurring on the host computing device 404. For example, techniques may be applied to the data, the results of which are compared to a threshold value; for example, the privileged instance or another component may compare the most recent hardware counter value to a threshold value 406, which if exceeded, triggers additional action, such as changing the interval 410; for example, from 5 minutes to 1 minute to provide more frequent updates. If the threshold is not exceeded, then the privileged instance receives a new counter value after waiting the prescribed interval 408. According to an embodiment, once the interval is adjusted, a new counter value is received after the new interval 412, and the new counter value is compared 414 to the same threshold value, or a new value. In some embodiments, the values may be averaged or otherwise statistically modified prior to being compared to one or more thresholds. For example, an accumulation of data may be analyzed, for example to determine characteristics of the data, such as by taking a first or second derivative to determine how fast data is accumulating or a rate at which the accumulation is changing. These types of determinations may be continuously occurring in various embodiments. A scalar quantity may be only one part of data accumulation and analysis according to various embodiments; a determination of a signal within a data stream in some embodiments may be determined and utilized according to the techniques described herein. In the example of counter data, while a single counter may provide useful data, a second- and/or third-order analysis of counter values, on one system or multiple systems (such as by aggregating multiple systems and families of systems, such as throughout a fleet of systems), may provide techniques to identify signal noise in the data, baselines, trends in the data, etc. In various embodiments, the techniques described above may be utilized in any aspect of the presently-described approaches, for example to determine potential matches of data to reference data (e.g., pattern data) to determine correlations.

If the threshold is not met after this subsequent analysis, then the privileged instance receives a new counter value after waiting the prescribed interval 408, or a new interval is selected, for example a default interval. If the threshold is met after the subsequent analysis, then the privileged instance could immediately send 416 one or more counter values to the central computing device (e.g., the pattern database), or take other action, such as determining a particular application executing on an instance of the host computing device that is responsible for a threshold number of event types over a specified time interval; for example, if 50 "cache miss" events were generated and counted by the "cache miss" hardware counter, then the privileged instance may determine this information, as well as send this information along with counter value data to the central computing device. According to an embodiment, the analysis of the counter values is performed without the need to access data or workloads associated with a customer of the multi-tenant environment.

Figure 5:
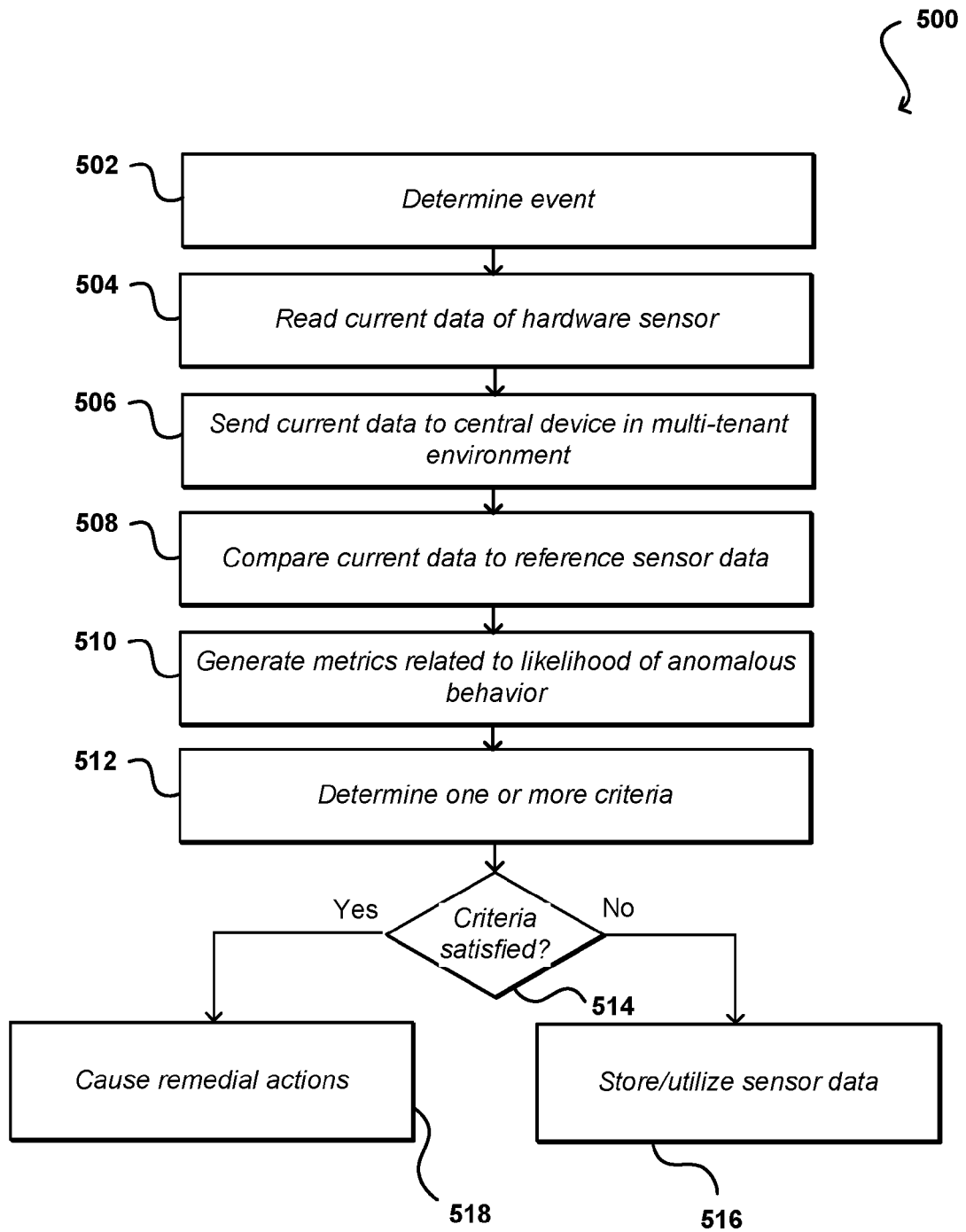
FIG. 5 illustrates an example process for detecting anomalous behavior in an electronic environment using hardware-based information that can be utilized in accordance with various embodiments.

FIG. 5 illustrates an example process 500 for making an initial determination of anomalous behavior in an electronic environment using information that can be utilized in accordance with various embodiments. In this example, an event (such as a temperature reading, etc.) occurring at a resource (e.g., a host computing device, a processor, a network interface, a virtual CPU, a virtual interface, etc.) is determined 502; for example, a "cache miss" event, a temperature range of one or more CPUs of one or more host machines, an event occurring in a virtual CPU, etc. A privileged instance may then obtain current data (such as a value or range of values, or information indicating a condition of a value or other data point over time, such as acceleration, velocity, etc.) of one or more of the hardware sensors 504, although various types of sensors (e.g., software, virtual, etc.) are envisioned, which is then sent 506 to a central database (e.g., stored on a central computing device, etc.), potentially along with other data such as alert data indicating a need for accelerated action.

The sensor data is compared 508, for example to a database of reference sensor data and/or other data. Metrics are then generated 510 related to a likelihood of anomalous behavior occurring on the resource based on the comparison. For example, a percentage may be assigned to each potential type of anomalous behavior indicating the likelihood that the particular type of anomalous behavior is occurring, based on the comparison (e.g., matching one or more sensor data values with a pattern or signature of sensor data values that indicate a likelihood of anomalous behavior, etc.). The metrics are then compared to one or more criteria 514; for example, whether any of the percentage values associated with potential anomalous behavior exceeds 80%, or other type of metric and evaluation. If the criteria is not satisfied, then the sensor data may be stored and/or utilized 516, for example for future pattern development or evaluation. If the criteria is satisfied, then remedial actions may be initiated 518 at the resource. According to an embodiment, the determination of potential anomalous behavior happening on a host computing device may be performed without accessing data and/or workloads associated with a customer instance running on the resource.

In at least one embodiment, the likelihood of potential anomalous behavior is performed by generating a potential signature of anomalous behavior occurring at the resource, for example by using the current sensor data(s), previous sensor data, the events associated with the sensor, time data such as intervals over which the sensor data was sampled, etc., and comparing the potential pattern and/or signature to a set of anomalous behavior signatures stored at the central database, for example having been generated using machine learning or other pattern analysis as described further herein.

In response to determining a likelihood of anomalous behavior occurring at the resource, various embodiments provide for various remedial actions, such as causing diagnostic tests to be executed at the resource or performing remediation of the anomalous behavior, such as by creating alerts and/or bringing in tools and/or human resources. These tests may in various examples determine an instance or instances responsible for, or otherwise associated with the anomalous behavior, and analyzing data such as workloads in order to determine additional information about the anomalous behavior, such as determining one or more applications causing the anomalous behavior, determining other instances in the multi-tenant environment running the application(s), analyzing those instances for anomalous behavior, etc.

Figure 6:
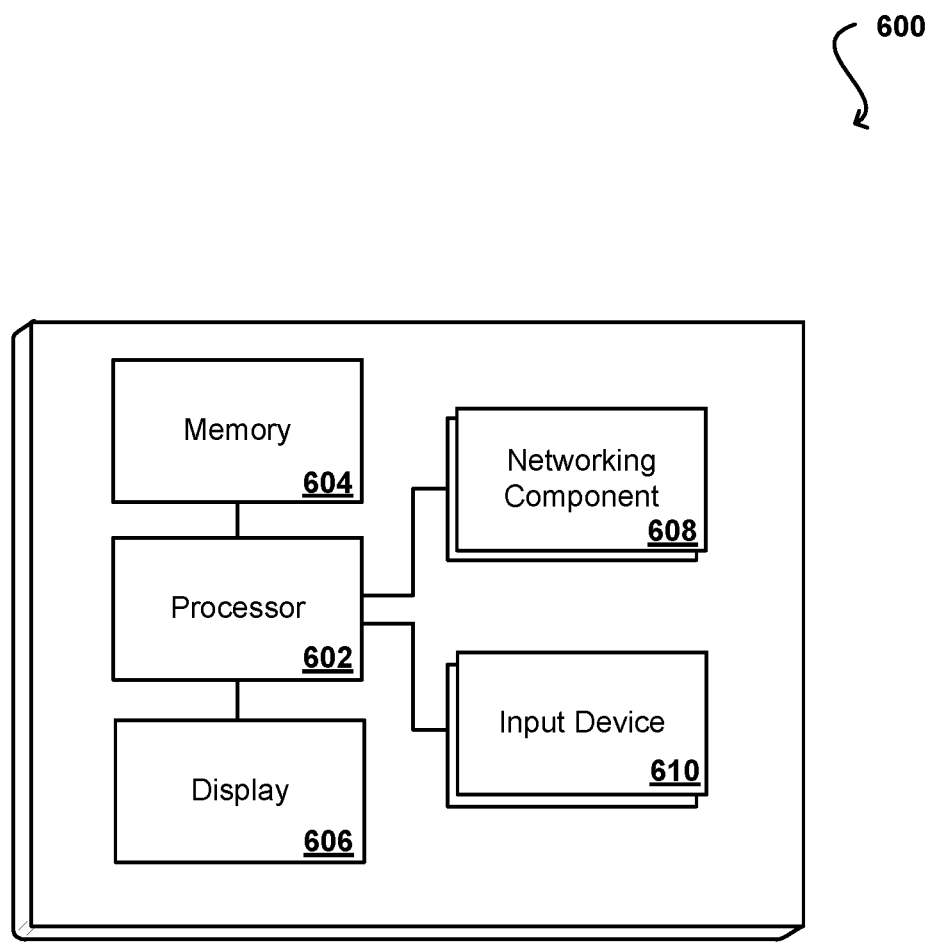
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining an event generated at a processing system of a host computing device in a multi-tenant environment, the event being generated in response to execution of a workload on an instance running on the host computing device, the instance associated with a customer having an account with a provider of the multi-tenant environment;
    receiving, at a first interval, a current value of a first hardware counter at a privileged instance running on the host computing device, the first hardware counter being at the processing system of the host computing device, a type of the first hardware counter being associated with the event and the value corresponding to a number of occurrences of the event on the host computing device;
    sending, from the privileged instance running on the host computing device, the current value of the first hardware counter to a central computing device in the multi-tenant environment;
    obtaining, from a database at the central computing device, one or more hardware counter patterns derived at least from reference values of the type of counter, the hardware counter patterns determined to be indicative of anomalous behavior;
    comparing the current value of the first hardware counter to the one or more hardware counter patterns; and
    determining, in response to the current value of the hardware counter corresponding to at least one of the one or more hardware counter patterns, that anomalous behavior is associated with the execution of the workload, wherein the determination of anomalous behavior is performed without accessing data stored on the instance associated with the customer.

2. The computer-implemented method of claim 1, further comprising:
    determining, by the privileged instance in response to receiving the current value of the first hardware counter, that the current value exceeds a threshold value;
    changing the first interval to a second interval, the second interval being a shorter duration;
    receiving, after the second interval, an updated current value of the first hardware counter;
    determining, by the privileged instance in response to receiving the updated current value of the first hardware counter, that the updated current value exceeds the threshold value; and
    sending, substantially immediately upon determining that the updated current value exceeds the threshold value, from the privileged instance running on the host computing device, the current value and the updated current value of the first hardware counter to the central computing device in the multi-tenant environment.

3. The computer-implemented method of claim 1, wherein each of the one or more hardware counter patterns are associated with a particular type of anomalous behavior, and further comprising:
    generating a correlation metric indicating a likelihood of the particular type of anomalous behavior associated with each of the one or more hardware counter patterns being the anomalous behavior associated with the execution of the workload, the correlation metric based at least on the comparison of the current value of the first hardware counter to the one or more hardware counter patterns;
    determining, based at least on the correlation metric, a probable type of anomalous behavior associated with the execution of the workload; and
    causing the processing system to perform one or more remedial actions associated with at least the probable type of anomalous behavior.

4. The computer-implemented method of claim 3, wherein performing the remedial action further comprises:
    generating an alert;
    suspending execution of the workload on the instance;
    isolating the instance from other instances running on the host computing device; and
    causing one or more diagnostic tests to be performed on the host computing device.

5. The computer-implemented method of claim 1, wherein the reference values of the first type of counter are obtained from a plurality of host computing devices in the multi-tenant environment, and further comprising:
    generating the one or more hardware counter patterns by training a baseline model using at least the reference values and confirmation data associated with the reference values indicating whether one or more of the reference values was indicative of a particular type of anomalous behavior.

6. A computer-implemented method, comprising:
    obtaining, by a privileged instance running on a resource in a multi-tenant environment, a current value of a first hardware counter associated with the resource, the first hardware counter being incremented based on a first event type being generated on the resource;
    sending, from the privileged instance, the current value of the first hardware counter to a central database of the multi-tenant environment;
    generating metrics related to a likelihood of anomalous behavior occurring on the resource, the metrics based at least in part on a comparison of the current value of the first hardware counter to reference values of hardware counters associated with events of the first event type, wherein the metrics comprise one or more hardware counter patterns; and
    determining, based at least on the metrics satisfying one or more criteria, that there is a likelihood of anomalous behavior occurring on the resource, wherein the determination of the likelihood of anomalous behavior occurring on the resource is performed without accessing customer data stored on an instance running on the resource.

7. The computer-implemented method of claim 6, wherein determining that there is a likelihood of anomalous behavior occurring on the resource further comprises:
   generating a potential signature of the anomalous behavior occurring on the resource, the potential signature being based at least on the current value of the first hardware counter, previous values of the first hardware counter provided to the central database, and time data; and
   comparing the potential signature to a set of anomalous behavior signatures stored at the central database.

8. The computer-implemented method of claim 6, further comprising:
   causing one or more diagnostic tests to be executed at the resource in response to determining that there is a likelihood of anomalous behavior occurring on the resource; and
   determining, based on results of the one or more diagnostic tests, a type of the anomalous behavior occurring on the resource.

9. The computer-implemented method of claim 8, further comprising:
   causing the resource to perform one or more remedial actions associated with the determined type of anomalous behavior,
   wherein the one or more remedial actions include at least one of: suspending at least one or more workloads executing on an instance running on the resource; isolating one or more instances running on the resource; generating an alarm, generating a notification for at least one user associated with the resource, migrating data stored on the resource, or increasing a rate at which values of the first hardware counter are sent to the central database.

10. The computer-implemented method of claim 6, further comprising:
    causing one or more diagnostic tests to be executed at the resource in response to determining that there is a likelihood of anomalous behavior occurring on the resource;
    determining, based on results of the one or more diagnostic tests, an instance running on the resource associated with the anomalous behavior occurring on the resource; and
    analyzing workloads associated with the instance to determine one or more applications executing on the instance causing the anomalous behavior.

11. The computer-implemented method of claim 10, further comprising:
    determining a plurality of instances running on other resources in the multi-tenant environment on which the one or more applications are executing; and
    determining whether the anomalous behavior is occurring on the other resources.

12. The computer-implemented method of claim 6, wherein the privileged instance is scheduled to obtain an updated current value of the first hardware counter a specified interval after obtaining the current value, and further comprising:
    determining, at the privileged instance prior to sending the current value of the first hardware counter to the central database, that the current value exceeds a threshold value;
    causing the updated current value of the first hardware counter to be obtained by the privileged instance prior to expiration of the specified interval and prior to sending the current value of the first hardware counter to the central database; and
    sending, based on the updated current value of the first hardware counter exceeding the threshold value, the current value of the first hardware counter, the updated current value of the first hardware counter, and alert data to the central database.

13. The computer-implemented method of claim 6, wherein the anomalous behavior includes at least one of:
    malicious behavior caused by instructions executing on an instance of the resource, sub-optimal performance of one or more components of the resource, or an impending failure of a hardware component of the resource.

14. The computer-implemented method of claim 6, further comprising:
    executing one or more queries on the central database in response to receiving at least one application programming interface (API) call over a network from a user.

15. The computer-implemented method of claim 6, wherein the resource is a host machine and the privileged instance comprises a DOM0 domain.

16. A system, comprising:
    a plurality of host machines comprising a multi-tenant environment, each host machine including at least one processor and memory for storing instructions that, when executed by the at least one processor, cause the system to:
    obtain, by a privileged instance running on one of the host machines, a current value of a first hardware sensor associated with the host machine, the first hardware sensor receiving sensor data based on a first event type being generated on the host machine;
    send, from the privileged instance, the sensor data of the first hardware sensor to a central database of the multi-tenant environment;
    generate metrics related to a likelihood of anomalous behavior occurring on the host machine, the metrics based at least in part on a comparison of the sensor data of the first hardware sensor to reference values of hardware sensor data associated with events of the first event type, wherein the metrics comprise one or more hardware counter patterns; and
    determine, based at least on the metrics satisfying one or more criteria, that there is a likelihood of anomalous behavior occurring on the host machine, wherein the determination of the likelihood of anomalous behavior occurring on the host machine is performed without accessing customer data stored on an instance running on the host machine.

17. The system of claim 16, wherein the instructions when executed further cause the system to:
    determine, by the privileged instance, that a particular application executing on an instance of the host machine is responsible for more than a threshold number of first event types being generated on the host machine over a specified time interval; and
    send, from the privileged instance along with the current value of the first hardware sensor to the central database of the multi-tenant environment, data identifying the particular application.

18. The system of claim 16, wherein the instructions when executed further cause the system to:

cause one or more diagnostic tests to be executed at the host machine in response to determining that there is a likelihood of anomalous behavior occurring on the host machine; and determine, based on results of the one or more diagnostic tests, a type of the anomalous behavior occurring on the host machine.

19. The system of claim 18, wherein the instructions when executed further cause the system to:

cause the host machine to perform one or more remedial actions associated with the determined type of anomalous behavior, wherein the one or more remedial actions include at least one of: suspending at least one or more workloads executing on an instance running on the host machine; isolating one or more instances running on the host machine; generating an alarm, generating a notification for at least one user associated with the host machine, migrating data stored on the host machine, or increasing a rate at which values of the first hardware sensor are sent to the central database.

20. The system of claim 16, wherein the privileged instance is scheduled to obtain an updated current value of the first hardware sensor a specified interval after obtaining the current value, and wherein the instructions when executed further cause the system to:

determine, at the privileged instance prior to sending the current value of the first hardware sensor to the central database, that the current value exceeds a threshold value;

cause the updated current value of the first hardware sensor to be obtained by the privileged instance prior to expiration of the specified interval and prior to sending the current value of the first hardware sensor to the central database; and send, based on the updated current value of the first hardware sensor exceeding the threshold value, the current value of the first hardware sensor, the updated current value of the first hardware sensor, and alert data to the central database.

* * * * *